United States Patent [19]

Horan et al.

[11] Patent Number: 4,938,648

[45] Date of Patent: Jul. 3, 1990

[54] SHIPPING DOCK HOOK

[75] Inventors: Mike T. Horan, Toronto; Donald R. Lidster, Oshawa, both of Canada

[73] Assignee: General Motors Corporation, Detroit, Mich.

[21] Appl. No.: 238,947

[22] Filed: Aug. 31, 1988

[51] Int. Cl.$^5$ .................. B65G 69/00; F15B 13/02
[52] U.S. Cl. ........................ 414/401; 91/4 R; 14/71.1; 414/584
[58] Field of Search .......... 91/4 R; 414/396, 401, 414/584; 14/71.1, 71.3

[56] References Cited

U.S. PATENT DOCUMENTS

| | | | |
|---|---|---|---|
| 3,494,027 | 2/1970 | Harelson | 91/4 R |
| 4,085,832 | 4/1978 | Gaines et al. | 188/268 |
| 4,127,856 | 11/1978 | Bickel | 414/401 X |
| 4,146,888 | 3/1979 | Gruenwald et al. | |
| 4,191,503 | 3/1980 | Neff et al. | |
| 4,208,161 | 6/1980 | Hipp et al. | |
| 4,264,259 | 4/1981 | Hipp | |
| 4,267,748 | 5/1981 | Grunewald et al. | |
| 4,268,007 | 5/1981 | Chittenden | 91/4 R X |
| 4,282,621 | 8/1981 | Anthony et al. | |
| 4,318,550 | 3/1982 | Jacobsen | 91/4 R X |
| 4,364,137 | 12/1982 | Hahn | |
| 4,373,847 | 2/1983 | Hipp et al. | |
| 4,379,354 | 4/1983 | Hahn et al. | |
| 4,443,150 | 4/1984 | Hahn et al. | |
| 4,472,099 | 9/1984 | Hahn et al. | 414/401 |
| 4,555,211 | 11/1985 | Metz | 414/401 |
| 4,560,315 | 12/1985 | Hahn | |
| 4,605,353 | 8/1986 | Hahn et al. | |
| 4,630,442 | 12/1986 | Massaro et al. | 91/4 R X |
| 4,634,334 | 1/1987 | Hahn et al. | |
| 4,692,755 | 9/1987 | Hahn | 414/401 X |
| 4,729,224 | 3/1988 | McAteer | 91/4 R X |
| 4,759,678 | 7/1988 | Hageman | 414/401 |

FOREIGN PATENT DOCUMENTS

| | | | |
|---|---|---|---|
| 775411 | 10/1980 | U.S.S.R. | 91/4 R |
| 1228089 | 4/1971 | United Kingdom | 91/4 R |

OTHER PUBLICATIONS

Levelators-Rotary Lift Company-1947-see p. 14.

*Primary Examiner*—David A. Bucci
*Assistant Examiner*—Robert S. Katz
*Attorney, Agent, or Firm*—Ernest E. Helms

[57] ABSTRACT

The present invention provides a truck shipping dock hook system for locking a truck trailer by an ICC bar to a shipping dock. The system includes a hook pivotally mounted to the dock, a pressurized air source, a normally closed first solenoid valve connected with the air source, a tank containing a low temperature fluid connected with the first solenoid valve and a second solenoid valve, a vent connected with the second solenoid valve, and a hydraulic cylinder with a piston rod pivotally connected to the hook for powering the same.

9 Claims, 2 Drawing Sheets

SHIPPING DOCK HOOK

FIELD OF THE INVENTION

The field of the present invention is that of dock hooking systems for locking a trailer of a truck to a loading dock.

DISCLOSURE STATEMENT

Truck trailers are typically backed up into a dock which is typically three or four feet above the bottom of the tires of the trailer. The trailer is secured to the dock for two reasons. First, securing the trailer to the dock prevents the trailer being pulled away from the dock by the truck while personnel are loading or unloading the dock. Secondly, when moving large heavy loads into the truck trailer, a forklift operator may suddenly apply the brakes. The sudden application of the brakes within the trailer may cause the trailer to be edged away from the loading dock. Hooking the trailer to the loading dock prevents the trailer being urged away.

SUMMARY OF THE INVENTION

The present invention provides a truck trailer dock hooking system which is an alternative to those previously available. Additionally, the trailer dock hooking system of the present invention is far more reliable under adverse, especially cold, weather conditions.

It is an object of the present invention to provide a tractor trailer dock hooking system.

It is an object of the present invention to provide a truck shipping dock hook system for locking a truck trailer by an ICC bar of the truck trailer to a dock, the system including a hook pivotally mounted with respect to the dock for locking the ICC bar to the dock, a presurized air source, a normally closed first solenoid valve fluidly connected with the air source, a tank containing a fluid which remains a liquid at relatively low temperatures, the tank being fluidly connected with the first solenoid valve, a second solenoid valve normally closed fluidly connected with the tank, a vent fluidly connected with the second solenoid valve, and a hydraulic cylinder divided by a piston with a connected rod, the rod being pivotally connected to the hook, the cylinder powering the hook and the cylinder having one side of the piston being fluidly exposed with the liquid of the tank, and the opposite side of the piston being exposed with the vent and the second solenoid valve whereby the hook is actuated upon the opening of the first solenoid valve and the hook can return to a retracted position upon the opening of the second solenoid valve and the closing of the first solenoid valve.

It is an object of the present invention to provide a locking a truck trailer with an ICC bar to a dock, the system including a hook pivotally mounted with respect to the dock for locking onto a truck trailer ICC bar, a pressurized air source, a normally closed first solenoid valve fluidly connected with the air source, a check valve fluidly connected with the first solenoid valve allowing fluid communication from but not toward the first solenoid valve, a tank containing a ethylene glycol solution fluidly connected with the first check valve, a second solenoid valve normally closed fluid connected with the tank above the level of the ethylene glycol solution, a vent fluidly connected with the second solenoid valve, an adjustable orifice fluidly connected with the ethylene glycol solution of the tank, a selectably open valve fluidly connected between the second solenoid valve and the vent, and a hydraulic cylinder for powering the hook divided by a piston with connected rod pivotally connected to the hook, the hydraulic cylinder having one end fluidly connected with the orifice and a second end on the opposite side of the piston fluidly connected with the vent and the second solenoid valve whereby the hook is actuated upon the opening of the first solenoid valve and the hook can be jerked in a retracted direction by the cylinder upon the momentary opening of the first solenoid valve the opening of the second solenoid value, and the closing of the selectable valve.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
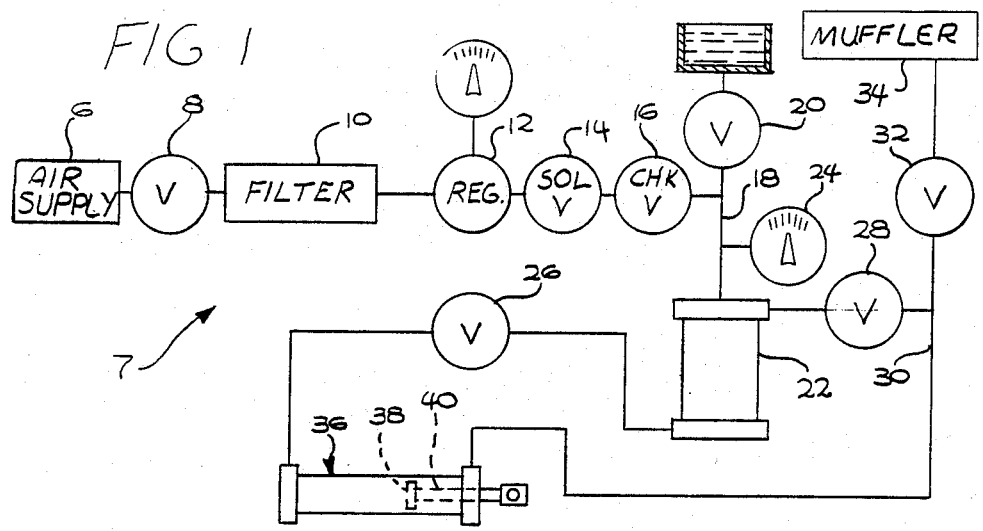
FIG. 1 is a schematic view of a preferred embodiment dock hook system of the present invention.
Figure 2:
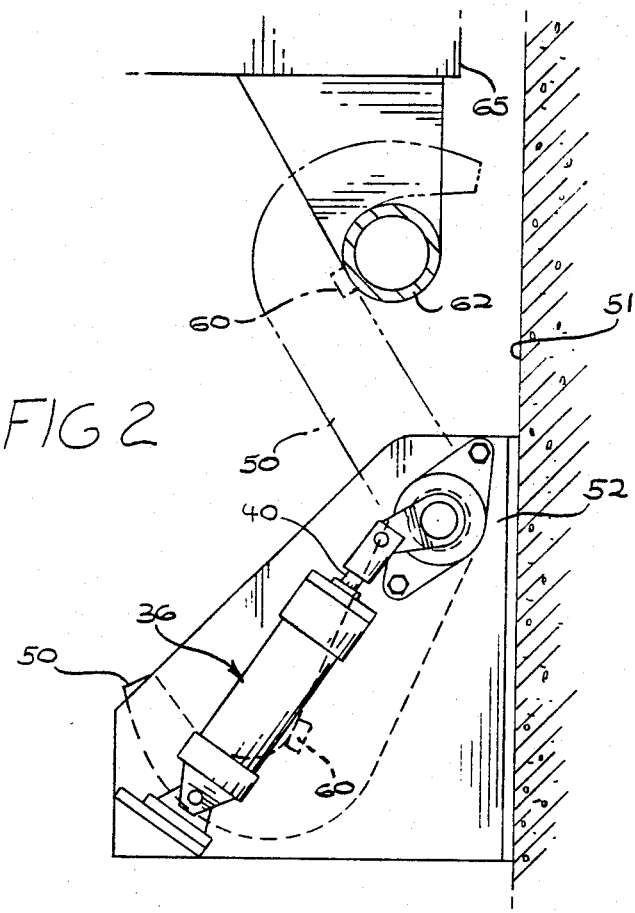
FIG. 2 is a side elevational view of a portion of the dock hook system.
Figure 3:
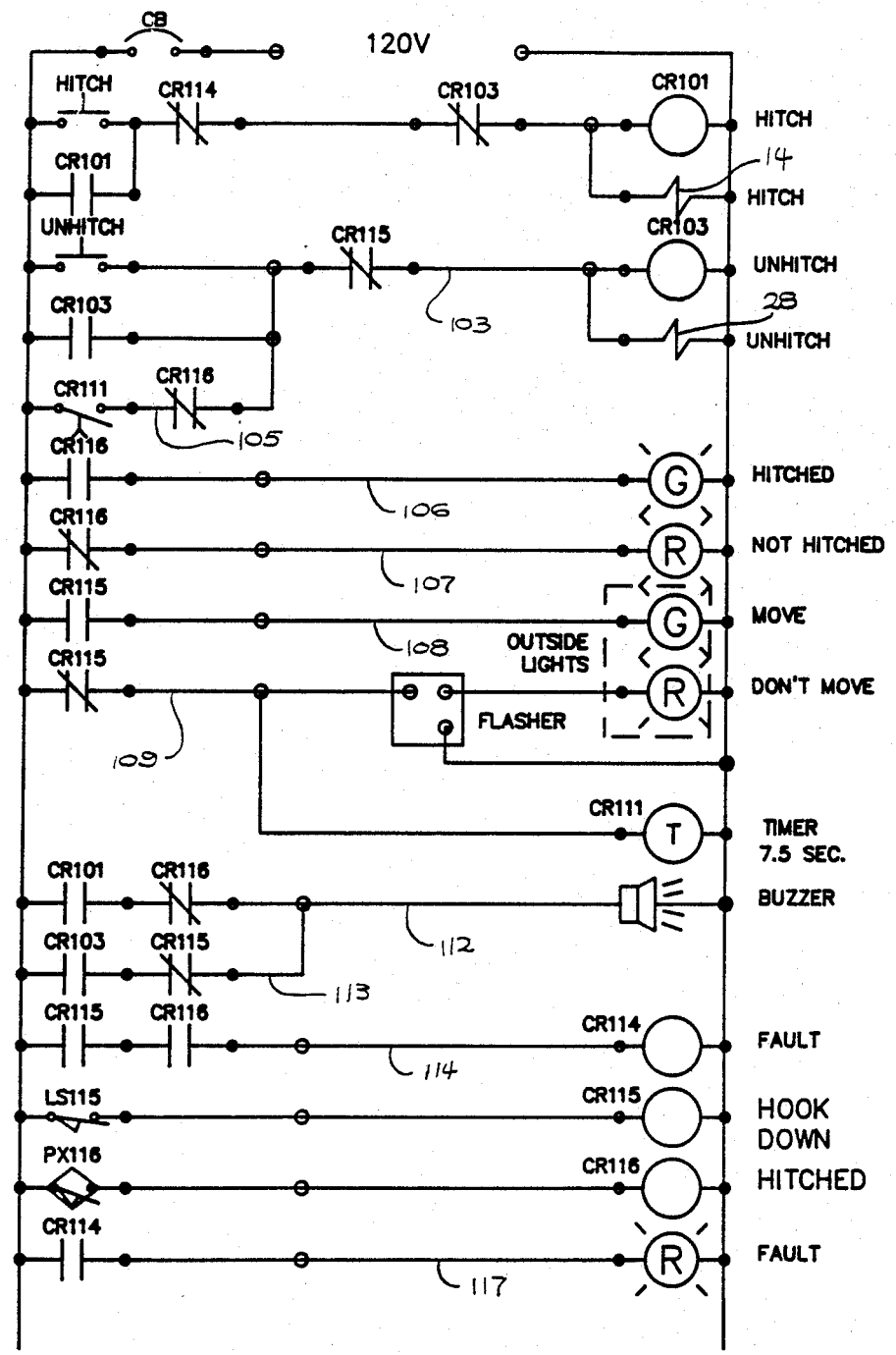
FIG. 3 is an electrical schematic of the control system of the dock hook system.

Referring to FIGS. 1, 2 and 3 the truck shipping dock hook system 7 of the present invention has a pressurized air source 6. Fluidly Connected with the air source 6 is a manual ball control valve 8 which is provided to close off the air supply for maintenance. Optionally connected with the air source 6 after the ball valve 8 is an air filter 10 and a pressure regulator/gauge 12 depending upon the parameters of the air source utilized.

The pressure regulator/gauge 12 is fluidly connected with the first control or solenoid valve 14. First solenoid valve 14 is a normally closed valve. Fluidly connected with the first two position solenoid valve 14 is a check valve 16 which allows fluid communication away from the first solenoid valve 14 but does not allow fluid communication towards the first solenoid valve 14. The check valve 16 communicates with a "T" 18. One end of the "T" 18 typically projects upwards in elevation and has a normally closed manual ball valve 20 leading to a make up reservoir. The normally closed ball valve 20 is opened when filling the system 7 with a fluid that remains a liquid at relatively low temperatures such as a water ethylene glycol solution. The other end of the "T" 18 extends past an optional pressure gauge 24 into a tank 22.

On the top half the tank 22 is exposed to the air source 6 (via valves 8, 14 and 16). On the bottom half, the tank 22 is filled with the water ethylene glycol solution. The tank 22 along its lower end fluidly communicates with an orifice means provided by an adjustable globe valve 26.

The top of the tank 22 is also fluidly connected with a two position second normally closed control or solenoid valve 28. The second solenoid valve fluidly communicates with a "T" 30. The top end of the "T" is connected via a manually selectively open valve 32 with an exhaust 34 (commonly referred to as a vent) with an optional muffler. In normal operation the valve 32 during operation is placed in a totally open position.

To power the system 7 there is provided a hydraulic cylinder 36. The hydraulic cylinder 36 has a piston 38 separating the water ethylene glycol solution from the opposite side which is continually during normal operation fluidly connected with the exhaust 34 and the second solenoid valve 28 via the "T" 30. A rod 40, connected with the piston 38, is pivotally connected with a hook 50 (FIG. 2) and typically the system 7 will be configured in such a manner that the hook 50 will weight sufficiently enough to cause the piston 38 to be biased towards the liquid side of the cylinder 36.

The hook 50 is pivotally connected with the dock via a bracket 52. Additionally, the hook has a proximity sensor 60 to signal that the ICC 62 (a structure required on truck trailers by the Innerstate Commerce Commission, commonly referred to as an ICC bar) bar has been contacted by the hook 50 in the upper locked position (phantom FIG. 2).

In the retracted hook 50 position (hidden line FIG. 2) the cylinder piston 38 is toward the liquid end of the cylinder 36. The operator will activate a hitch switch. Current will flow through normally closed contacts CR114 and CR103 to activate relay CR101. Since relay CR101 is activated the operator does not have to hold finger on the bottom since normally open relay CR101 will latch relay CR101 on. The above will also cause the solenoid valve 14 to be excited to an open position. Opening of the first solenoid valve 14 will cause air to pass through the check valve 16 and down the "T" 18 toward the tank 22 since the valve 20 is closed. Since the second solenoid valve 28 is closed liquid will be forced downward in the tank 22 through the valve 26 at a controlled flow rate of entry into the cylinder 36. Piston 38 is pushed outward thereby pivoting the hook 50 to a locked position. The above-noted movement will typically continue until the proximity sensor 60 makes contact with the ICC bar of truck trailer 65. The sensor 60 will then signal the first solenoid valve 14 to shut off and at this point the trailer 65 is locked to the dock 51.

The upward movement of the hook 50 will cause relay CR115 to be deactivated therefore closing relay CR115 on line 109 and activating timer relay CR111 for a small period of time. If the hook 50 does not make contact with the ICC bar 62 in prescribed seconds CR111 on line 105 will close, and current will travel through relays CR116 (line 105) through CR115 (line 103) to solenoid 28 and relay CR103 to link to return the hook to the rest position. Lines 106 and 107 are to light the control panels to allow the operator to know if the hook is hitch or unhitched. Lines 108 and 109 inform the truck driver when he can move or when the trailer 65 is still hooked to the dock 51.

Line 109 also provides a flasher. Lines 12 and 113 provide a buzzer when the hook is moving. Lines 114 and 117 combine to alert the dock hook system operator that there is a fault in the system 7.

To unlock the hook 50, first solenoid valve 4 is closed and second solenoid valve 28 is opened. The weight of hook 50 will cause piston 38 to be retracted pushing fluid back into tank 22. Air is vented from the tank 22 through second solenoid valve 28 to "T" 30 past the valve 32 and out to the exhaust 34.

In cases of electrical failure the first and second solenoid valves 14, 28 will still be shut since they are normally closed, therefore loss of electrical power will not allow the hook to to release from the ICC 62. If the air supply system 6 should fail check valve 16 will retain pressure within tank 22 and again the hook 50 will remain locked to the ICC 62.

Due to the fact that a ethylene glycol water solution is utilized other than other hydraulic fluids, the system 7 has extremely good low temperature performance characteristics which is vital when utilize in northern regions of North America during the winter time. However, if the system should freeze up (due to water surrounding the pivotal connection of hook 50) the air system can be utilized to jerk the hook 50 in a retracted direction. The first solenoid valve 14 is momentarily opened and the valve 32 is partially or totally closed. Pressurized air will flow into the tank 22 past the second solenoid valve 28 to apply air pressure on the piston 38 via T 30. The above action in combination with the weight of the hook 50 causes the piston 38 to be forced in a retracted position. First solenoid 14 is then closed and valve 32 is reopened and fluid will now flow from cylinder 36 back up into tank 22.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A truck shipping dock hook system for locking a truck trailer by an ICC bar of said truck trailer to a dock, said system in combination comprising:
    a hook pivotally mounted with respect to the dock for locking said ICC bar to said dock;
    a pressurized air source;
    a normally closed two position first solenoid valve fluidly connected with said air source;
    a tank containing a fluid which remains a liquid at relatively low temperatures, said tank being fluidly connected with said first solenoid valve;
    a second two position solenoid valve normally closed fluidly connected with said tank;
    a vent fluidly connected with said second solenoid valve; and
    a hydraulic cylinder divided by a piston with a connected rod, said rod being pivotally connected to said hook, said cylinder powering said hook and said cylinder having one side of said piston being fluidly exposed with said fluid of said tank, and the opposite side of said piston being continually exposed with said vent and said second solenoid valve whereby said hook is actuated upon the opening of said first solenoid valve and said hook can return to a retracted position upon the opening of said second solenoid valve and the closing of said first solenoid valve.

2. An apparatus as described in claim 1 wherein said fluid contains ethylene glycol.

3. An apparatus as described in claim 1 further including an orifice fluidly connected between said tank and said cylinder for controlling the rate of fluid communication between said tank and said cylinder.

4. An apparatus as described in claim 1 further including a check valve between said first solenoid valve and said tank allowing fluid communication only toward said tank.

5. An apparatus as described in claim 1 further including with said hook a proximity switch on said hook switch to sense when there is contact between said hook and said ICC bar.

6. A truck dock shipping system for locking a truck trailer with an ICC bar to a dock, said system in combination comprising:
- a hook pivotally mounted with respect to the dock for locking onto a truck trailer ICC bar;
- a pressurized air source;
- a normally closed first solenoid valve fluidly connected with said air source;
- a check valve fluidly connected with said first solenoid valve allowing fluid communication from but not toward said first solenoid valve;
- a tank containing an ethylene glycol solution fluidly connected with said first check valve;
- a second solenoid valve normally closed fluidly connected with said tank above the level of said ethylene glycol solution;
- a vent fluidly connected with said second solenoid valve;
- an adjustable orifice fluidly connected with said ethylene glycol solution of said tank;
- a selectably open valve fluidly connected between said second solenoid valve and said vent; and
- a hydraulic cylinder for powering said hook divided by a piston with a connected rod pivotally connected to said hook, said hydraulic cylinder having one end fluidly connected with said orifice and a second end on the opposite side of said piston fluidly connected with said vent and said second solenoid valve whereby said hook is actuated upon the opening of said first solenoid valve and said hook can be jerked in a retracted direction by said cylinder upon the momentary opening of said first solenoid valve, the opening of the second solenoid valve, and the closing of said selectable valve.

7. An apparatus as described in claim 6 wherein said hook when extended onto said ICC bar remains locked to said ICC bar regardless of any failure of said air source or solenoid valves.

8. A truck dock shipping system for locking a truck trailer with an ICC bar to a dock, said system in combination comprising:
- a hook pivotally mounted with respect to the dock for locking onto a truck trailer ICC bar;
- a pressurized air source;
- a normally closed first solenoid valve fluidly connected with said air source;
- a check valve fluidly connected with said first solenoid valve allowing fluid communication from but not toward said first solenoid valve;
- a tank containing a fluid which remains a liquid at relatively low temperatures fluidly connected with said first check valve;
- a second solenoid valve normally closed fluidly connected with said tank above the level of said tank fluid;
- a vent fluidly connected with said second solenoid valve;
- an adjustable orifice fluidly connected with said tank fluid;
- a selectably open valve fluidly connected between said second solenoid valve and said vent; and
- a hydraulic cylinder for powering said hook divided by a piston with a connected rod pivotally connected to said hook, said hydraulic cylinder having one end fluidly connected with said orifice and a second end on the opposite side of said piston fluidly connected with said vent and said second solenoid valve whereby said hook is actuated upon the opening of said first solenoid valve and said hook can be jerked in a retracted direction by said cylinder upon the momentary opening of said first solenoid valve, the opening of the second solenoid valve, and the closing of said selectable valve.

9. An apparatus as described in claim 8 wherein said hook when extended onto said ICC bar remains locked to said ICC bar regardless of any failure of said air source or solenoid valves.

* * * * *